United States Patent
Cho et al.

(10) Patent No.: US 9,807,259 B2
(45) Date of Patent: Oct. 31, 2017

(54) METHOD FOR PROVIDING SERVICE THROUGH SOLUTION SERVER IN SECURITY ENVIRONMENT, AND APPARATUS AND SYSTEM FOR PERFORMING THE SAME

(71) Applicant: SAMSUNG ELECTRONICS CO., LTD., Suwon-si, Gyeonggi-do (KR)

(72) Inventors: Tae-gyun Cho, Hwaseong-si (KR); Hyo-eun Kim, Seoul (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 15/165,176

(22) Filed: May 26, 2016

(65) Prior Publication Data

US 2017/0085725 A1    Mar. 23, 2017

(30) Foreign Application Priority Data

Sep. 18, 2015  (KR) .......................... 10-2015-0132610

(51) Int. Cl.
  *H04N 1/00*   (2006.01)
  *H04L 29/08*  (2006.01)

(52) U.S. Cl.
  CPC ........... *H04N 1/0023* (2013.01); *H04L 67/02* (2013.01); *H04L 67/28* (2013.01); *H04N 1/00217* (2013.01); *H04N 1/00244* (2013.01); *H04N 1/00411* (2013.01); *H04N 2201/0094* (2013.01)

(58) Field of Classification Search
  CPC .................................................. H04N 1/0023
  USPC ....................................................... 358/1.15
  See application file for complete search history.

(56) References Cited

U.S. PATENT DOCUMENTS

| | | | |
|---|---|---|---|
| 8,000,329 B2 | 8/2011 | Fendick et al. | |
| 8,654,668 B2 | 2/2014 | Fendick et al. | |
| 2003/0045308 A1 | 3/2003 | Sidhu et al. | |
| 2012/0081749 A1* | 4/2012 | Kitada | G06F 3/121 358/1.15 |
| 2012/0110065 A1* | 5/2012 | Oshima | G06F 3/1204 709/203 |
| 2012/0133974 A1* | 5/2012 | Nakamura | G06F 3/1212 358/1.15 |
| 2013/0212163 A1* | 8/2013 | Shimomoto | H04N 1/00225 709/203 |
| 2014/0025832 A1* | 1/2014 | Ito | H04L 65/1069 709/228 |
| 2015/0153980 A1* | 6/2015 | Ito | G06F 3/1236 358/1.14 |

* cited by examiner

*Primary Examiner* — Jacky X Zheng
(74) *Attorney, Agent, or Firm* — Staas & Halsey LLP

(57) ABSTRACT

A system which provides a solution service to an image forming apparatus and includes a solution server having a solution application installed therein, an image forming apparatus configured to provide a user interface (UI) for the solution application and perform a job requested by the solution server, and a message server configured to communicate with the solution server and the image forming apparatus. The solution server transmits a job request to the message server by using a message protocol, and the image forming apparatus receives the job request by accessing the message server.

15 Claims, 21 Drawing Sheets

FIG. 16

```
                                                                      1600a
<iq type='set' id='4'
   from='myapp1@acme.com/appserver'
   to='printer1@acme.com/webserver'>
      <req xmlns='urn:xmpp:http' method='POST' resource=' / sparql/ ?xxx' version='1.1'>
         <headers xmlns='http://jabber.org/protocol/shim'>                    1601
            <header name='Host' >printer1@acme.com</header>
            ...
            <header name='Authorization' >OAuth
               oauth_signature="3002c7bbf27cc60fe60db74e0889722f%
                                              26cfb93bdcdf05382bc14c96981d7740e9",
               oauth_version="1.0", oauth_consumer_key="LocalUI",
               oauth_signature_method="PLAINTEXT",
               oauth_token="d630907827acc98f136603c1ee5"
            <header name='Content-Type' >application/json</header>
            <header name='Content-Length' > . . . </header>
         </headers>
         <data>
            <text>xxx</text>
         </data>
      </req>
</iq>
```

```
                                                                      1600b
<iq type='result' id='4'
   from='printer1@acme.com/webserver'>
   to='myapp1@acme.com/appserver'>
      <resp xmlns='urn:xmpp:http' version='1.1' statusCode='200' statusMessage='OK'>
         <headers xmlns='http://jabber.org/protocol/shim'>                    1602
            <header name='Date' >Fri, 03 May 2013 17:09:34 -4</header>
            ...
            <header name='X-UP-Signature' >OAuth
               oauth_signature="3002c7bbf27cc60fe60db74e0889722f%26",
               realm="Samsung_XOA-Web", oauth_version="1.0", oauth_signature_method="PLAINTEXT",
               oauth_consumer_key="LocalUI",
            <header name='Content-Type' >application/json</header>
            <header name='Content-Length' > . . . </header>
         </headers>
         <data>
         </resp>
</iq>
```

FIG. 19

```
<presence from='mfp@xyz.com/mfp'>
   <show>chat</show>
   <status>Samsung CLX-3340, available</status>
   <c xmlns='http://jabber.org/protocol/caps'
      hash='sha-1'
      node='http://xoaframework.net/ev/1'
      ver='QgayPKawpkPSDYmwT/WM94uAIu0='/>
</presence>

</presence type="unavailable" from='mfp@xyz.com/mfp'>
</presence>
```

FIG. 20

```
<iq type='get'
    from='solution@acme.com/main'
    to='mfp@xyz.com/mfp'
    id='info1'
  <query xmlns='http://jabber.org/protocol/disco#info'
         node='http://xoaframework.net/gv/1#QgayPKawpkPSDYmwT/WM94uAIu0='/>
</iq>

<iq type='result'
    from='mfp@xyz.com/mfp'
    to='solution@acme.com/main'
    id='info1'
  <query xmlns='http://jabber.org/protocol/disco#info'
         node='http://xoaframework.net/gv/1#QgayPKawpkPSDYmwT/WM94uAIu0='/>
         node='http://xoaframework.net/gv/1#QgayPKawpkPSDYmwT/WM94uAIu0='/>
    <identity
        category='automation'
        type='http'
        name='<configured device name>'/>
    <feature var='http://jabber.org/protocol/caps'/>
    <feature var='http://jabber.org/protocol/disco#info'/>
    <feature var='http://jabber.org/protocol/disco#items'/>
    <feature var='urn:xmpp:http'/>
    <feature var='http://xoaframework.net/unifiedprotocol'/>
    <x xmlns='jabber:x:data' type='result'>
      <field var='FORM_TYPE' type='hidden'>
        <value>http://xoaframework.net/unifiedprotocol</value>
      </field>
      <field var='implVersion'>
        <value>201405301024a.dev</value>
      </field>
      <field var='majorVersionssupported'>
        <value>1</value>
      </field>
    </x>
    <x xmlns='jabber:x:data' type='result'>
      <field var='FORM_TYPE' type='hidden'>
        <value>http://xoaframework.net/unifiedprotocol#v1</value>
      </field>
      <field var='interfaceVersion'>
        <value>1.17.2</value>
      </field>
      <field var='xraVersion'>
        <value>1.4.2</value>
```

METHOD FOR PROVIDING SERVICE THROUGH SOLUTION SERVER IN SECURITY ENVIRONMENT, AND APPARATUS AND SYSTEM FOR PERFORMING THE SAME

CROSS-REFERENCE TO RELATED APPLICATIONS

This application claims the priority benefit of Korean Patent Application No. 10-2015-0132610 filed on Sep. 18, 2015, in the Korean Intellectual Property Office, the disclosure of which is incorporated herein in its entirety by reference.

BACKGROUND

1. Field

The disclosure relates to methods and systems for providing a solution service to an image forming apparatus through a solution server in a security environment.

2. Description of the Related Art

Recently, technologies for supporting customized solutions in addition to functions embedded in multi-function printers are widely used. There are generally two methods for supporting these technologies.

The first method is to install a solution application in a multi-function printer. In this case, the solution application installed in the multi-function printer may operate in the same manner as other functions embedded in the multi-function printer.

The second method is to install a solution application in an external server, display only a user interface (UI) of the solution application through a browser by a multi-function printer, and operate the solution application by the multi-function printer by communicating with the external server when a user performs an operation through the UI displayed by the multi-function printer. In the case of the second method, through an application programming interface (API) for controlling the multi-function printer, the external server may control a job in the multi-function printer or may identify or change setup information of the multi-function printer.

In general, a firewall is installed for security reasons between a multi-function printer used in an enterprise and an external server for providing a solution. However, in this case, the communication between the multi-function printer and the external server may be restricted due to the firewall.

SUMMARY

Provided are methods and systems for stably providing a solution service to an image forming apparatus through a solution server even in a security environment in which an access is restricted due to a firewall.

Additional aspects will be set forth in part in the description which follows and, in part, will be apparent from the description, or may be learned by practice of the disclosed exemplary embodiments.

According to an aspect of an exemplary embodiment, a system for providing a solution service to an image forming apparatus may include: a solution server having a solution application installed therein, an image forming apparatus configured to provide a user interface (UI) for the solution application and perform a job requested by the solution server, and a message server configured to communicate with the solution server and the image forming apparatus, wherein the solution server transmits a job request to the message server by using a message protocol, and the image forming apparatus receives the job request by accessing the message server.

Herein, the solution server may convert the job request into a data type of the message protocol and transmit the converted job request to the message server, and the message server may store the received job request.

Also, herein, a firewall may be provided between the image forming apparatus and the message server to restrict an access from the message server to the image forming apparatus, and when the image forming apparatus transmits a pull request to the message server, the message server may transmit the stored job request to the image forming apparatus in response to the pull request.

Alternatively, the image forming apparatus may perform a job corresponding to the received job request, convert a job response representing a result of performing the job into a data type of the message protocol, and transmit the converted job response to the message server, and the message server may store the received job response.

Also, herein, a firewall may be provided between the solution server and the message server to restrict an access from the message server to the solution server, and when the solution server transmits a pull request to the message server, the message server may transmit the stored job response to the solution server in response to the pull request.

Alternatively, the message server may be implemented as an embedded type in the solution server or as a proxy server relaying a communication between the image forming apparatus and the solution server.

Alternatively, the message server may include: a first message server configured to communicate with the solution server, and a second message server configured to communicate with the image forming apparatus and the first message server, wherein the first message server may receive a job request from the solution server and transmit the received job request to the second message server, and the second message server may receive a job response from the image forming apparatus and transmit the received job response to the first message server, and the image forming apparatus may receive the job request by accessing the second message server, and the solution server may receive the job response by accessing the first message server.

Alternatively, the image forming apparatus may communicate with the message server through a message server connection agent embedded in or implemented outside the image forming apparatus.

According to an aspect of an exemplary embodiment, a system for providing a solution service to an image forming apparatus may include: a solution server having a solution application installed therein, and an image forming apparatus configured to provide a user interface (UI) for the solution application and perform a job requested by the solution server, wherein a firewall is provided between the image forming apparatus and the solution server to restrict an access from the solution server to the image forming apparatus, and the image forming apparatus receives a job request by accessing the solution server, performs a job corresponding to the received job request, and then transmits a job response thereof to the solution server.

According to an aspect of an exemplary embodiment, an image forming apparatus may include: a communication unit configured to communicate with a solution server through a message server, a user interface (UI) unit configured to provide a UI for a solution application installed in the solution server and receive a user input, a job performing unit configured to perform an image forming job corresponding to a job request of the solution server, and a control unit configured to control reception of the job request and performance of the job, wherein the control unit accesses the message server to receive a job request transmitted from the solution server to the message server.

Herein, through the communication unit, the control unit may periodically transmit a pull request to the message server and receive the job request from the message server in response to the pull request.

Alternatively, the control unit may control the job performing unit to perform an image forming job corresponding to the received job request, convert a job response representing a result of performing the job into a data type of a message protocol, and transmit the converted job response to the message server.

According to an aspect of an exemplary embodiment, a method for providing a solution service to an image forming apparatus may include: transmitting a job request to a message server by using a message protocol by a solution server having installed therein a solution application provided with a user interface (UI) from an image forming apparatus, receiving the job request by the image forming apparatus by accessing the message server, and performing an image forming job corresponding to the received job request by the image forming apparatus.

Herein, the transmitting of the job request may include: converting the job request into a data type of the message protocol and transmitting the converted job request to the message server by the solution server, and storing the received job request by the message server.

Also, herein, a firewall may be provided between the image forming apparatus and the message server to restrict an access from the message server to the image forming apparatus, and the receiving of the job request may include: transmitting a pull request to the message server by the image forming apparatus, and transmitting the stored job request to the image forming apparatus by the message server in response to the pull request.

Alternatively, the method may further include: converting a job response representing a result of performing the job into a data type of the message protocol and transmitting the converted job response to the message server by the image forming apparatus, and storing the received job response by the message server.

Herein, a firewall may be provided between the solution server and the message server to restrict an access from the message server to the solution server, and the method may further include: transmitting a pull request to the message server by the solution server, and transmitting the stored job response to the solution server by the message server in response to the pull request.

According to an aspect of another exemplary embodiment, a method for providing a solution service to an image forming apparatus may include: providing, by an image forming apparatus, a user interface (UI) for a solution application installed in a solution server, receiving, by the image forming apparatus, a job request stored in a message server by accessing the message server according to a user input received through the UI, and performing an image forming job corresponding to the received job request. The job request stored in the message server may be received from the solution server by using a message protocol.

Herein, the receiving of the job request may include: periodically transmitting a pull request to the message server, and receiving the job request from the message server in response to the pull request.

Alternatively, the method may further include converting a job response representing a result of performing the image forming job into a data type of the message protocol and transmitting the converted job response to the message server.

BRIEF DESCRIPTION OF THE DRAWINGS

These and/or other aspects will become apparent and more readily appreciated from the following description of the exemplary embodiments, taken in conjunction with the accompanying drawings in which:

FIG. 16 is a diagram illustrating an example of a message protocol including authentication information in a header thereof;

FIG. 19 illustrates an example of a status message that is transmitted to a message server by a multi-function printer when the multi-function printer is connected to the message server;

FIG. 20 illustrates an example of a response message to a service discovery request of a message server when a multi-function printer is connected to the message server.

DETAILED DESCRIPTION

Figure 1:
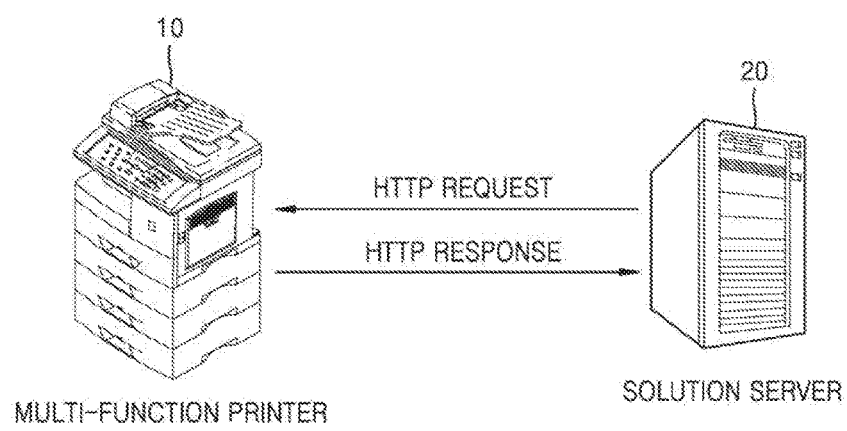
FIG. 1 is a diagram illustrating an environment for receiving a solution service from a multi-function printer through a general external server.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the inventive concept. As used herein, the term "and/or" may include any and all combinations of one or more of the associated listed items.

Hereinafter, exemplary embodiments will be described in detail with reference to the drawings. In order to more clearly describe features of the exemplary embodiments, descriptions of details widely known to those of ordinary skill in the art will be omitted herein.

Although a case of using a multi-function printer (MFP) in exemplary embodiments will be described as an example herein, it will be apparent that various other types of image forming apparatuses such as printers, scanners, and copiers may also be used instead.

FIG. 1 is a diagram illustrating an environment for receiving a solution service from a multi-function printer through a general external server.

Referring to FIG. 1, a solution application is installed in a solution server 20, and an installation (setup) file including information of the solution server 20 is installed in a multi-function printer 10. The multi-function printer 10 transmits/receives commands and data for a solution service by communicating with the solution server 20 through a hypertext transfer protocol (HTTP), and provides a user interface (UI) for providing a solution service to a user through an embedded Web browser.

The solution server 20 operates as a service client to transmit an HTTP request to the multi-function printer 10, and the multi-function printer 10 operates as a service server to transmit an HTTP response in response to the HTTP request received from the solution server 20. In this case, the HTTP request may be, for example, a request to perform a job in the multi-function printer 10, or a request to change or identify information set in the multi-function printer 10. Thus, the HTTP response may be, for example, a result of performing the job, a result of changing the information set in the multi-function printer 10, or a return of the information set in the multi-function printer 10.

In the environment illustrated in FIG. 1, since the communication between the multi-function printer 10 and the solution server 20 may not be restricted at all, the multi-function printer 10 and the solution server 20 may respectively operate as a service server and a service client and perform HTTP communication between each other to provide a solution service.

In general, such a solution service is used by an enterprise and the solution service is provided by another external enterprise; however, in many cases, the enterprise has an internal network installed with a firewall for security. When the multi-function printer 10 is located behind the firewall of the enterprise, the solution server 20 may fail to transmit the HTTP request because its access to the multi-function printer 10 is restricted. Also, when the solution server 20 is provided inside a complex cloud infra-network, the access of the multi-function printer 10 to the solution server 20 may also be restricted.

Thus, the following exemplary embodiments provide methods for providing a solution service even in a network environment that may not ensure complete bidirectional communication.

Figure 2:
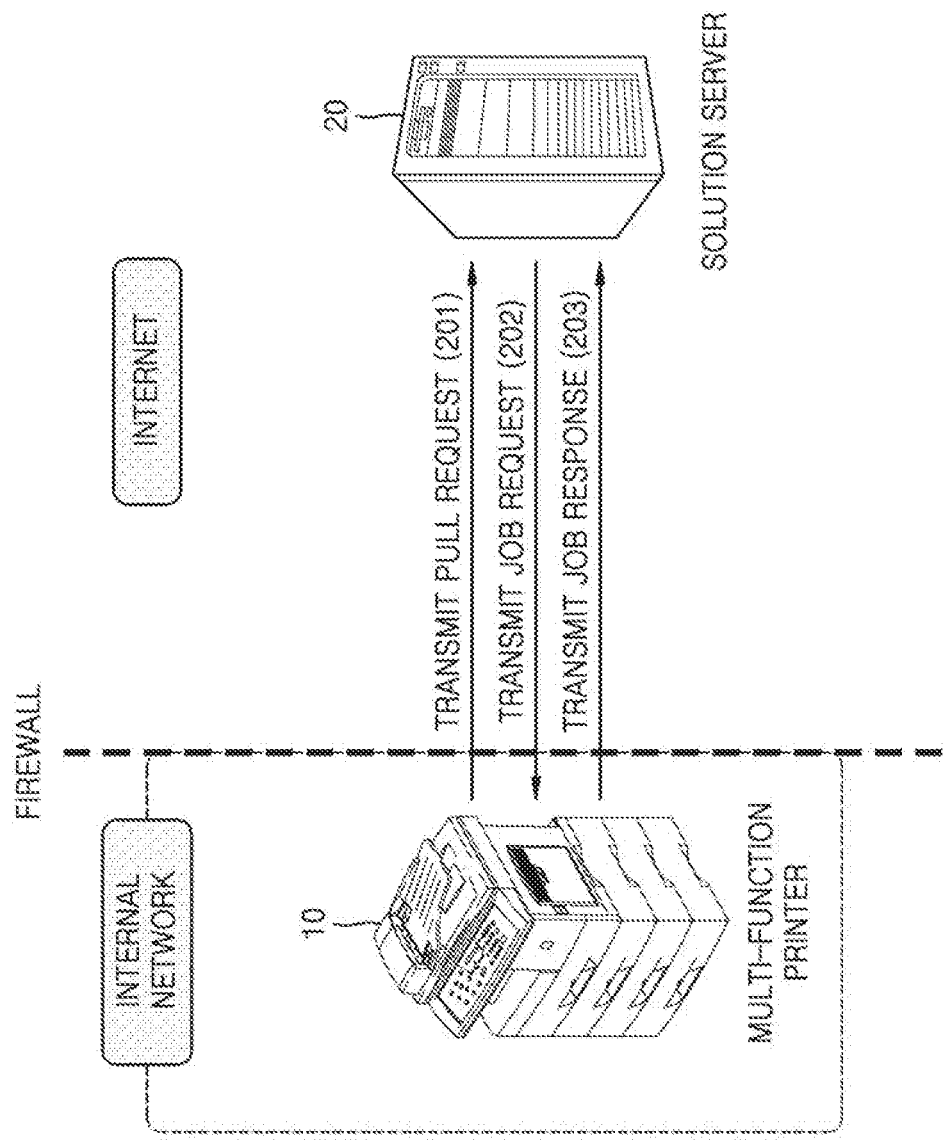
FIG. 2 is a diagram illustrating an environment for providing a solution service to a multi-function printer located behind a firewall of an enterprise, according to an exemplary embodiment.

FIG. 2 is a diagram illustrating an environment for providing a solution service to a multi-function printer located behind a firewall of an enterprise, according to an exemplary embodiment.

Referring to FIG. 2, a multi-function printer 10 is located in an internal network of an enterprise, and a firewall is set for the internal network. In this case, since the multi-function printer 10 uses an internal IP behind the firewall, the access thereto from outside the firewall is restricted. Thus, a solution server 20 may not first transmit an HTTP request to the multi-function printer 10.

Thus, in the exemplary embodiment, the multi-function printer 10 is set to operate not as a service server but as a service client to first transmit an HTTP request to the solution server 20 (operation 201). In this case, since the HTTP request transmitted from the multi-function printer 10 to the solution server 20 is not to request an actual operation to the solution server 20 but to pull an HTTP request for requesting a job from the solution server 200, it will hereinafter be referred to as a pull request.

When the multi-function printer 10 transmits a pull request to the solution server 20, the solution server 20 transmits a job request for requesting a job as an HTTP response to the received pull request (operation 202). In this case, the solution server 20 may prepare beforehand a command list for requesting a job to the multi-function printer 10 and transmit the prepared command list to the multi-function printer 10 when receiving the pull request from the multi-function printer 10. Since the solution server 20 transmits the job request to the multi-function printer 10 as a response to the HTTP request (pull request) received from the multi-function printer 10, it may transmit the job request to the multi-function printer 10 without being restricted by the firewall.

The multi-function printer 10 performs a job corresponding to the received job request and then transmits a job response thereof to the solution server 20 in the form of an HTTP response (operation 203). For example, when the received job request is a request for performing an image forming job such as printing, the multi-function printer 10 may perform an image forming job and transmit a result of performing the image forming job as a job response. As another example, when the received job request is a request for identifying or changing information set in the multi-function printer 10, the multi-function printer 10 may transmit the requested information as a job response or may change the information and transmit a result of the changing as a job response.

Also, the multi-function printer 10 may pull a job request from the solution server 20 by periodically transmitting a pull request to the solution server 20.

Figure 3:
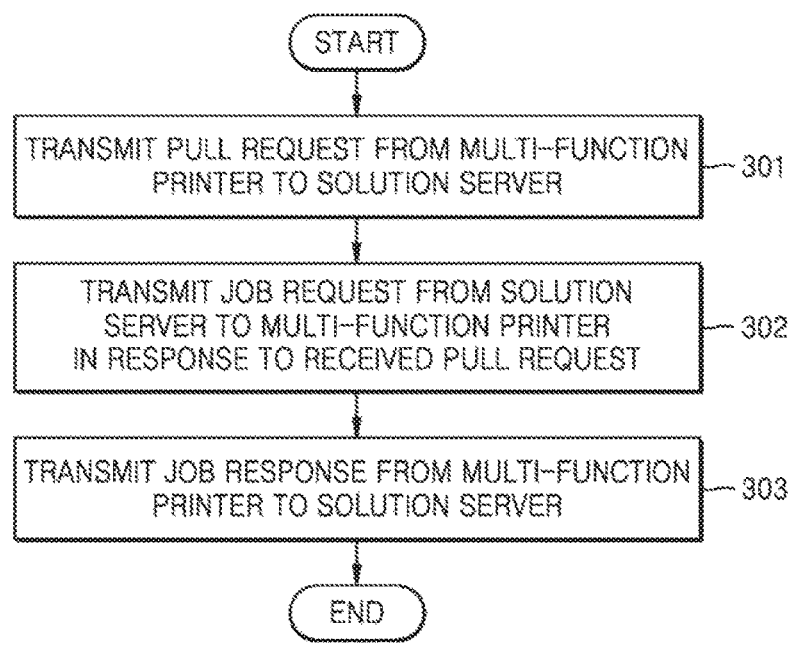
FIG. 3 is a flowchart illustrating a method for providing a solution service to a multi-function printer located behind a firewall of an enterprise, according to an exemplary embodiment.

FIG. 3 is a flowchart illustrating a method for providing a solution service to a multi-function printer located behind a firewall of an enterprise, according to an exemplary embodiment.

Referring to FIG. 3, in operation 301, the multi-function printer transmits a pull request to a solution server. In this case, although the multi-function printer has to originally operate as a service server, since the access of the solution server to the multi-function printer is blocked by a firewall, the multi-function printer first operates as a service client to transmit an HTTP request (pull request) to the solution server.

In operation 302, the solution server transmits a job request as an HTTP response to the multi-function printer in response to the received pull request. In this case, the solution server may prepare beforehand a command list for the job request and transmit the prepared command list to the multi-function printer when receiving the pull request from the multi-function printer.

In operation 303, the multi-function printer transmits a job response to the solution server. That is, for example, the multi-function printer may perform a job corresponding to the job request received from the solution server and transmit a result of performing the job as the job response to the solution server. In this case, the requested job may be performance of an image forming job, identification of setup information, or changing of information, and the job response in each case may be a result of performing the image forming job, the setup information, or a result of changing the information.

Also, by additionally providing a message server between the multi-function printer and the solution server, an HTTP request/response may be transmitted/received by using a message protocol. Hereinafter, with reference to FIGS. 4 to 6, a description will be given of exemplary embodiments for additionally providing a message server on the side of a solution server and providing a solution service to a multi-function printer located behind a firewall. In particular, FIG. 4 illustrates an exemplary embodiment of embedding a message server in a solution server, and FIG. 5 illustrates an exemplary embodiment of providing a separate message server.

Figure 4:
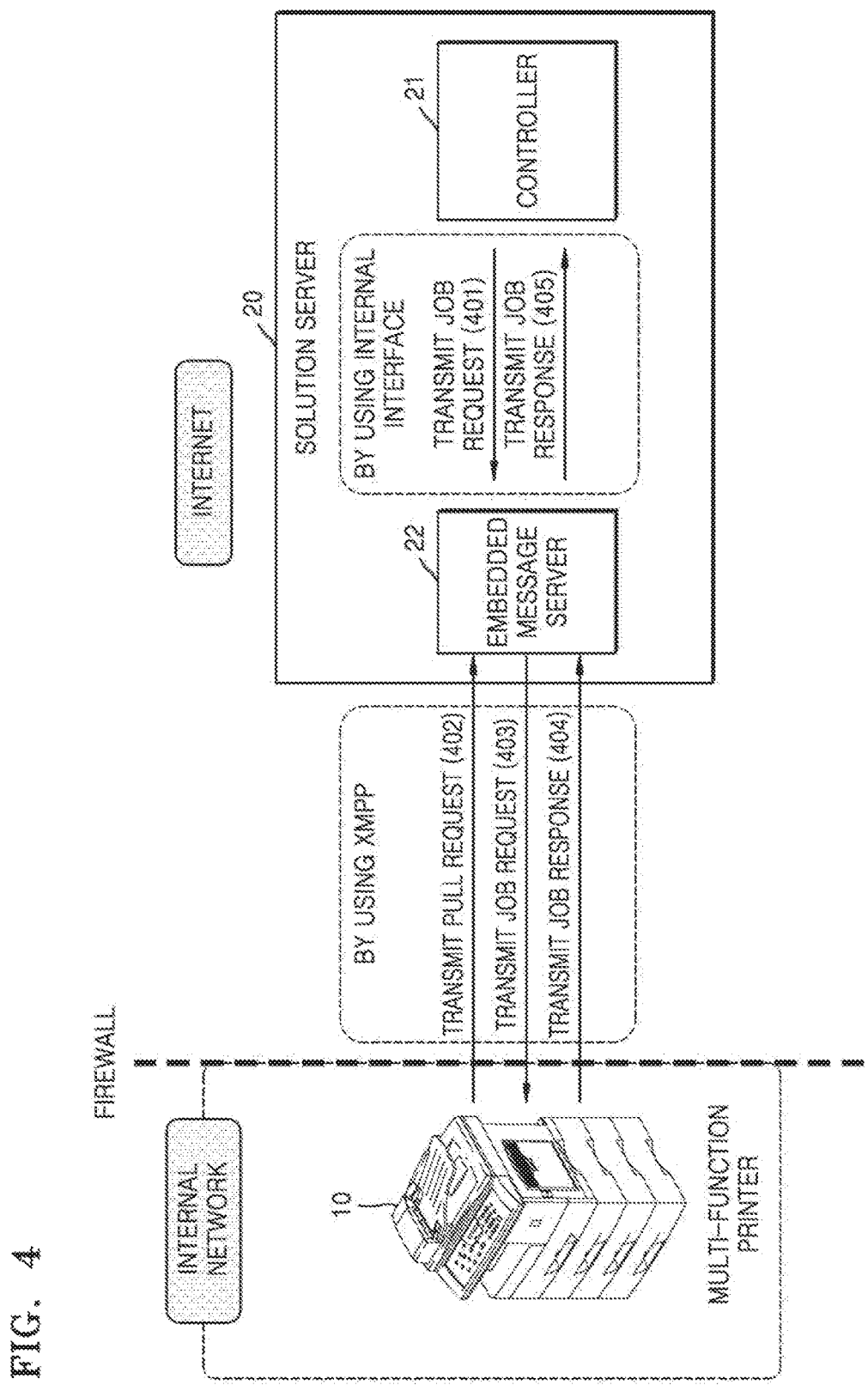
FIG. 4 is a diagram illustrating an environment for providing a solution service to a multi-function printer located behind a firewall by using a message server embedded in a solution server, according to an exemplary embodiment.
Figure 5:
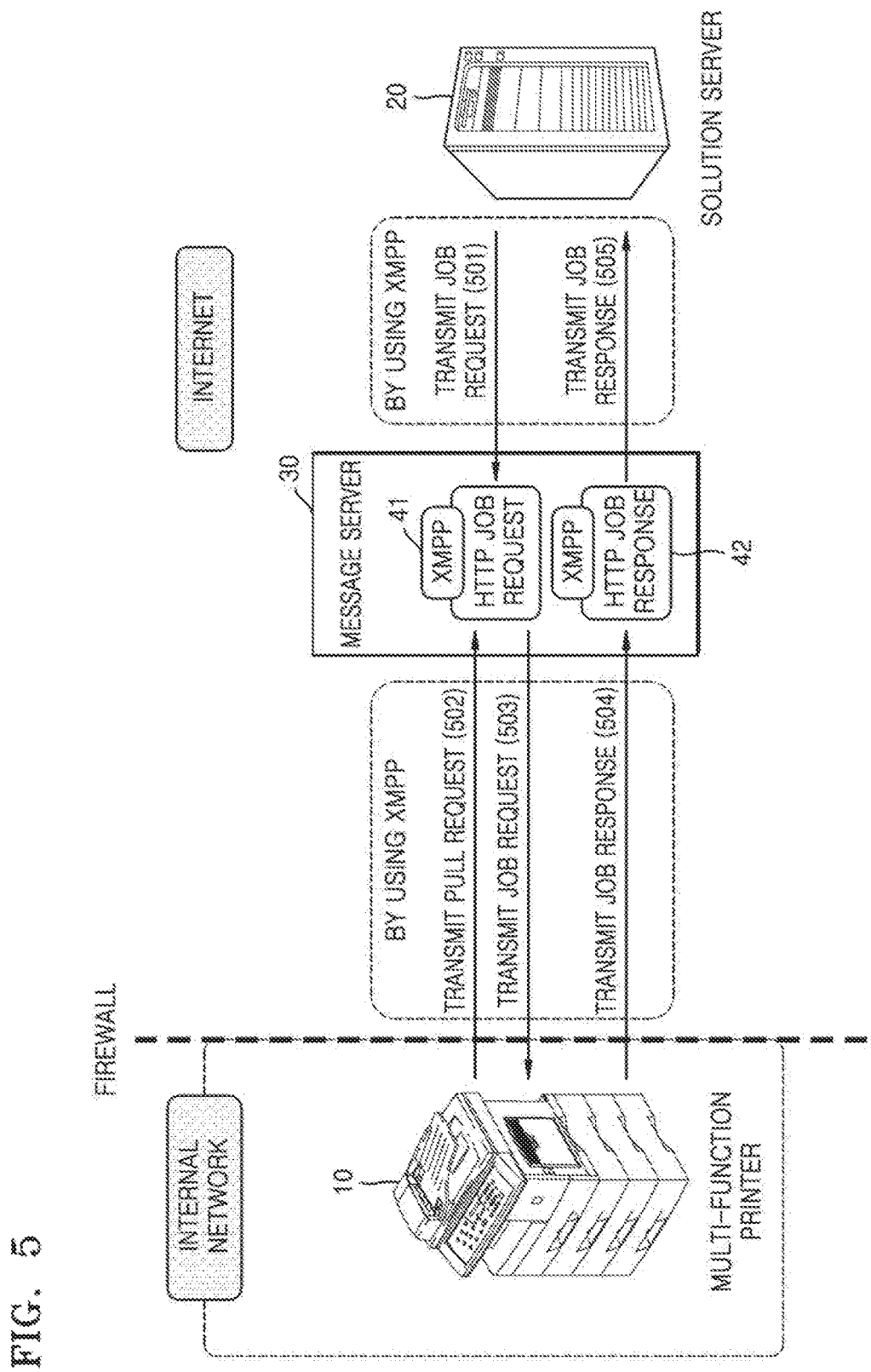
FIG. 5 is a diagram illustrating an environment for providing a solution service to a multi-function printer located behind a firewall by using a message server provided separately from a solution server, according to an exemplary embodiment.

FIG. 4 is a diagram illustrating an environment for providing a solution service to a multi-function printer located behind a firewall by using a message server embedded in a solution server, according to an exemplary embodiment.

Referring to FIG. 4, a solution server 20 may include a controller 21 and an embedded message server 22. The controller 21 may be a component such as a central processing unit (CPU) or a processor for controlling an overall operation of the solution server 20. The embedded message server 22 may be a server for supporting a message relay function. In the exemplary embodiment, the embedded message server 22 may support a function for transmitting/receiving an HTTP request/response to/from a multi-function printer 10 through a message protocol such as an extensible messaging and presence protocol (XMPP).

According to the exemplary embodiment illustrated in FIG. 4, the multi-function printer 10 and the embedded message server 22 of the solution server 20 transmit/receive a request/response in the form of a message by using the XMPP. In detail, for example, the multi-function printer 10 and the embedded message server 22 capsulate a desired HTTP-based request/response in XMPP-type data and then transmit the capsulated request/response by using the XMPP.

In this manner, by performing communication based on the XMPP, various multi-function printers may communicate with the server by using one common protocol and also a development load in terms of the multi-function printer may be minimized by using the existing protocol. Also, various security effects provided by the XMPP may be facilitated, and an efficient communication mechanism may be used as it is.

In the following exemplary embodiments, although not described separately, it is assumed that both the multi-function printer 10 and the solution server 20 perform communication in the same manner as above by using the message server and the XMPP. Although XMPP communication is illustrated in the exemplary embodiment, it will be apparent that other types of protocols may also be used instead of the XMPP.

Referring to FIG. 4, the controller 21 of the solution server 20 transmits a job request to the embedded message server 22 (operation 401). In this case, since the embedded message server 22 is provided in the solution server 20, the controller 21 may transmit the job request to the embedded message server 22 by using an internal interface instead of a communication protocol. However, for XMPP communication between the embedded message server 22 and the multi-function printer 10, the controller 21 converts a job request (HTTP request) into XMPP-type data and transmits the same to the embedded message server 22.

The multi-function printer 10 transmits a pull request to the embedded message server 22 (operation 402), and receives the job request stored in the embedded message server 22, as a response thereto (operation 403). In this case, since the job request converted into XMPP-type data is stored in the embedded message server 22 as described above, the embedded message server 22 may transmit the stored job request to the multi-function printer 10 by using the XMPP.

The multi-function printer 10 converts the received XMPP-type data, extracts the HTTP-based job request, and performs a job corresponding to the extracted job request. When completing the job performance, the multi-function printer 10 converts a job response into XMPP-type data and then transmits the same to the embedded message server 22 by using the XMPP (operation 404).

The embedded message server 22 transmits the received job response to the controller 21 (operation 405). In this case, the embedded message server 22 may also transmit the job response to the controller 21 through the internal interface. However, since the job response transmitted from the embedded message server 22 to the controller 21 is converted into the XMPP-type data, the controller 21 may identify the job result through a process of reconverting and interpreting the received job response. That is, for example, the controller 21 extracts an HTTP job response from the received XMPP-type data and interprets the extracted data.

FIG. 5 is a diagram illustrating an environment for providing a solution service to a multi-function printer located behind a firewall by using a message server provided separately from a solution server, according to an exemplary embodiment.

Referring to FIG. 5, a message server 30 is provided separately outside a solution server 20. However, since the message server 30 is located on the side of the solution server 20 with respect to the firewall, the bidirectional communication between the message server 30 and the solution server 20 is not restricted.

In the exemplary embodiment illustrated in FIG. 5, since the message server 30 is located outside the solution server 20, the communication between the solution server 20 and the message server 30 is also performed by using the XMPP.

The solution server 20 transmits an HTTP job request converted into XMPP-type data to the message server 30 (operation 501). A multi-function printer 10 converts an HTTP-based pull request into XMPP-type data and transmits the same to the message server 30 (operation 502). FIG. 5 schematically illustrates an HTTP job request 41 converted into XMPP-type data. The message server 30 transmits the HTTP job request 41 converted into the XMPP-type data to the multi-function printer 10 in response to the pull request of the multi-function printer 10 (operation 503).

After performing a job, the multi-function printer 10 converts an HTTP-based job response into XMPP-type data and transmits the same to the message server 30 (operation 504). FIG. 5 schematically illustrates an HTTP job response 42 converted into XMPP-type data.

Thereafter, the message server 30 transmits the HTTP job response 42 converted into the XMPP-type data to the solution server 20 (operation 505). The solution server 20 extracts an HTTP job response from the received XMPP-type data and interprets the extracted data.

Figure 6:
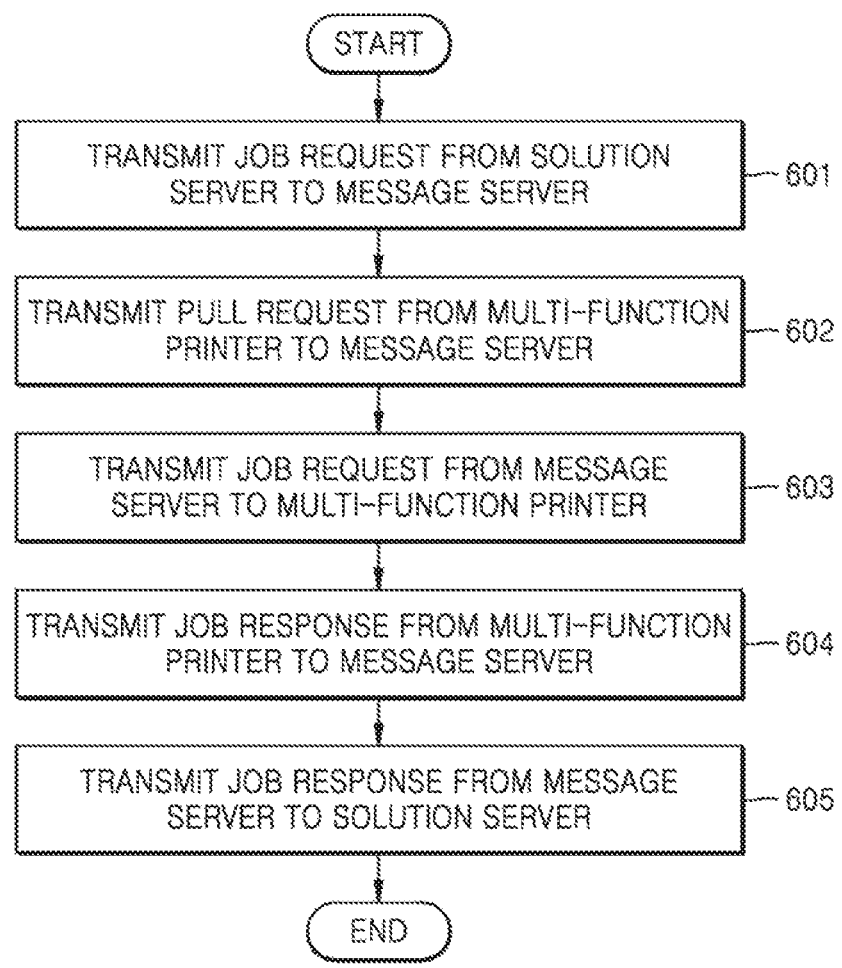
FIG. 6 is a flowchart illustrating a method for providing a solution service to a multi-function printer located behind a firewall by using a message server provided on the side of a solution server, according to an exemplary embodiment.

FIG. 6 is a flowchart illustrating a method for providing a solution service to a multi-function printer located behind a firewall by using a message server provided on the side of a solution server, according to an exemplary embodiment.

Referring to FIG. 6, in operation 601, the solution server transmits a job request to the message server. In this case, the message server may be a server embedded in the solution server or may be a server provided separately outside the solution server. When the message server is provided in the solution server, the solution server may transmit the job request to the message server through an internal interface without using a communication protocol. However, when the message server is provided outside the solution server, the solution server may transmit the job request by using a communication protocol (e.g., XMPP) supported by the message server.

In operation 602, the multi-function printer transmits a pull request to the message server. In this case, the multi-function printer converts a pull request (HTTP request) into XMPP-type data and transmits the same to the message server.

In operation 603, the message server transmits a job request to the multi-function printer in response to the pull request of operation 602. In this case, the job request is received from the solution server and stored by the message server in operation 601.

The multi-function printer performs a job corresponding to the job request received from the message server and transmits a job response to the message server in operation 604. In this case, the multi-function printer converts the XMPP-type data received from the message server to extract an HTTP-based job request, and also converts the job response into XMPP-type data prior to transmission to the message server.

In operation 605, the message server transmits a job response to the solution server.

The exemplary embodiments, in which only the multi-function printer is located behind the firewall and thus only the access from the solution server to the multi-function printer is restricted, have been described above. However, when the solution server is provided inside a complex cloud infra-network, the access from the multi-function printer to the solution server may also be restricted. Exemplary embodiments for such a case will be described below with reference to FIGS. 7 to 12.

Figure 7:
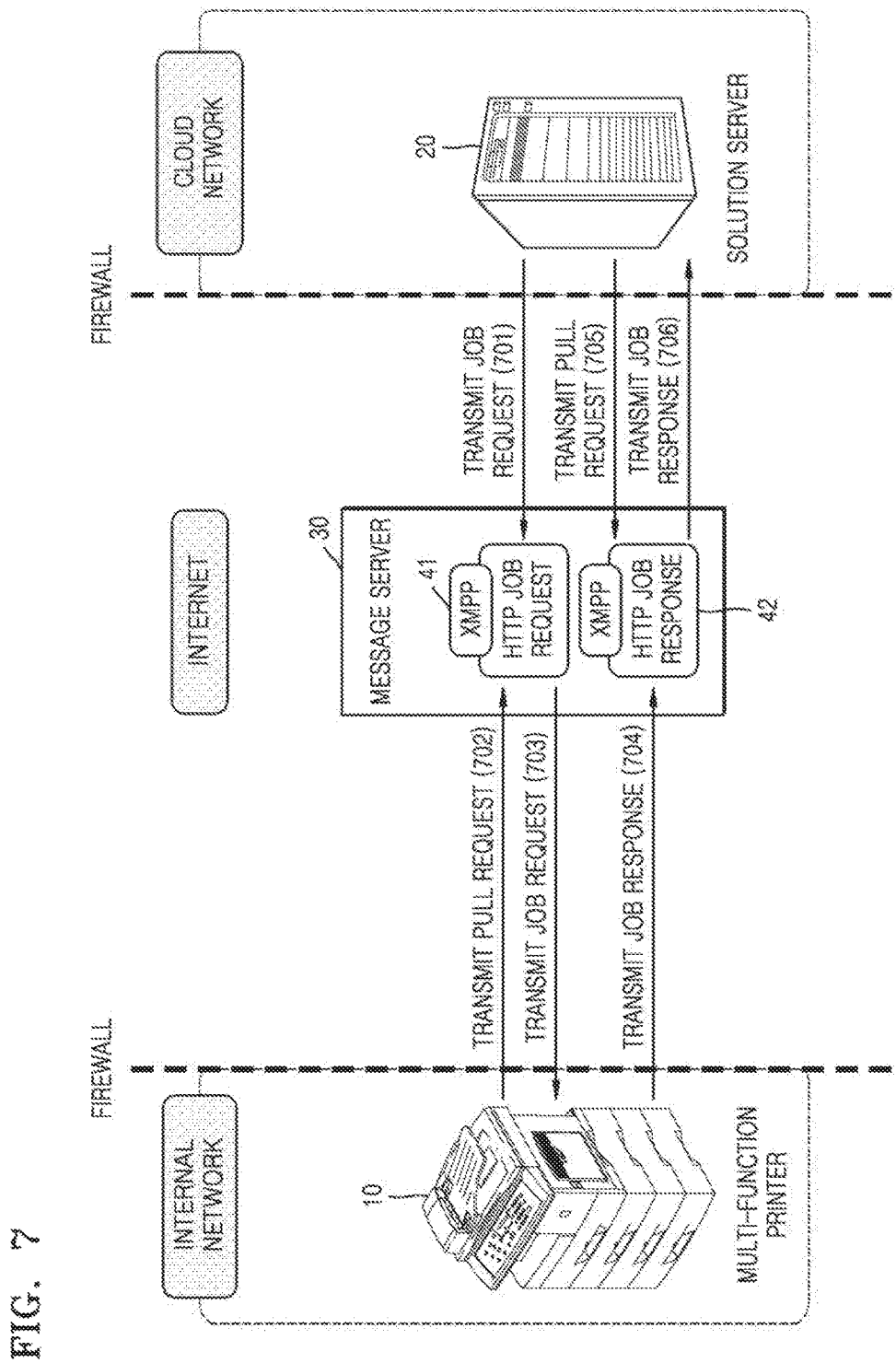
FIG. 7 is a diagram illustrating an environment for providing a solution service to a multi-function printer located behind a firewall, by a solution server located behind another firewall, by using a message server, according to an exemplary embodiment.

FIG. 7 is a diagram illustrating an environment for providing a solution service to a multi-function printer located behind a firewall, by a solution server, located behind another firewall, by using a message server, according to an exemplary embodiment.

Referring to FIG. 7, a multi-function printer 10 and a solution server 20 are located behind different firewalls. Thus, not only the access from the solution server 20 to the multi-function printer 10 but also the access from the multi-function printer 10 to the solution server 20 may be restricted.

In order to solve this problem, in the exemplary embodiment, a message server 30 outside the firewalls is used as a shared server. That is, since each of the multi-function printer 10 and the solution server 20 may access the message server 30 without restriction, by transmitting a pull request and receiving an HTTP response thereto, the multi-function printer 10 may pull a job request from the message server 30 and the solution server 20 may pull a job response from the message server 30.

Also, in FIG. 7, both the communication between the multi-function printer 10 and the message server 30 and the communication between the solution server 20 and the message server 30 are based on XMPP communication.

When the solution server 20 transmits an HTTP job request 41 converted into XMPP-type data to the message server 30 (operation 701), the multi-function printer 10 transmits a pull request to the message server 30 (operation 702) and thereby receives the HTTP job request 41 converted into the XMPP-type data from the message server 30 (operation 703).

The multi-function printer 10 converts the HTTP job request 41 converted into the XMPP-type data and extracts an HTTP job request to perform a job. When completing the job, the multi-function printer 10 converts a job response, which may include a result of performing the job, into XMPP-type data and transmits the same to the message server 30 (operation 704).

Due to the firewall, the message server 30 may not transmit a job response to the solution server 20. Therefore, the solution server 20 transmits a pull request to the message server 30 (operation 705), and the message server 30 transmits an HTTP job response 42 converted into XMPP-type data to the solution server 20 as a response thereto (operation 706).

In FIG. 7, the message server 30 is separately provided to support the XMPP communication between the multi-function printer 10 and the solution server 20. However, if a proxy server is provided between the multi-function printer 10 and the solution server 20, a message server may be embedded in the proxy server. An exemplary embodiment thereof is illustrated in FIG. 8.

Figure 8:
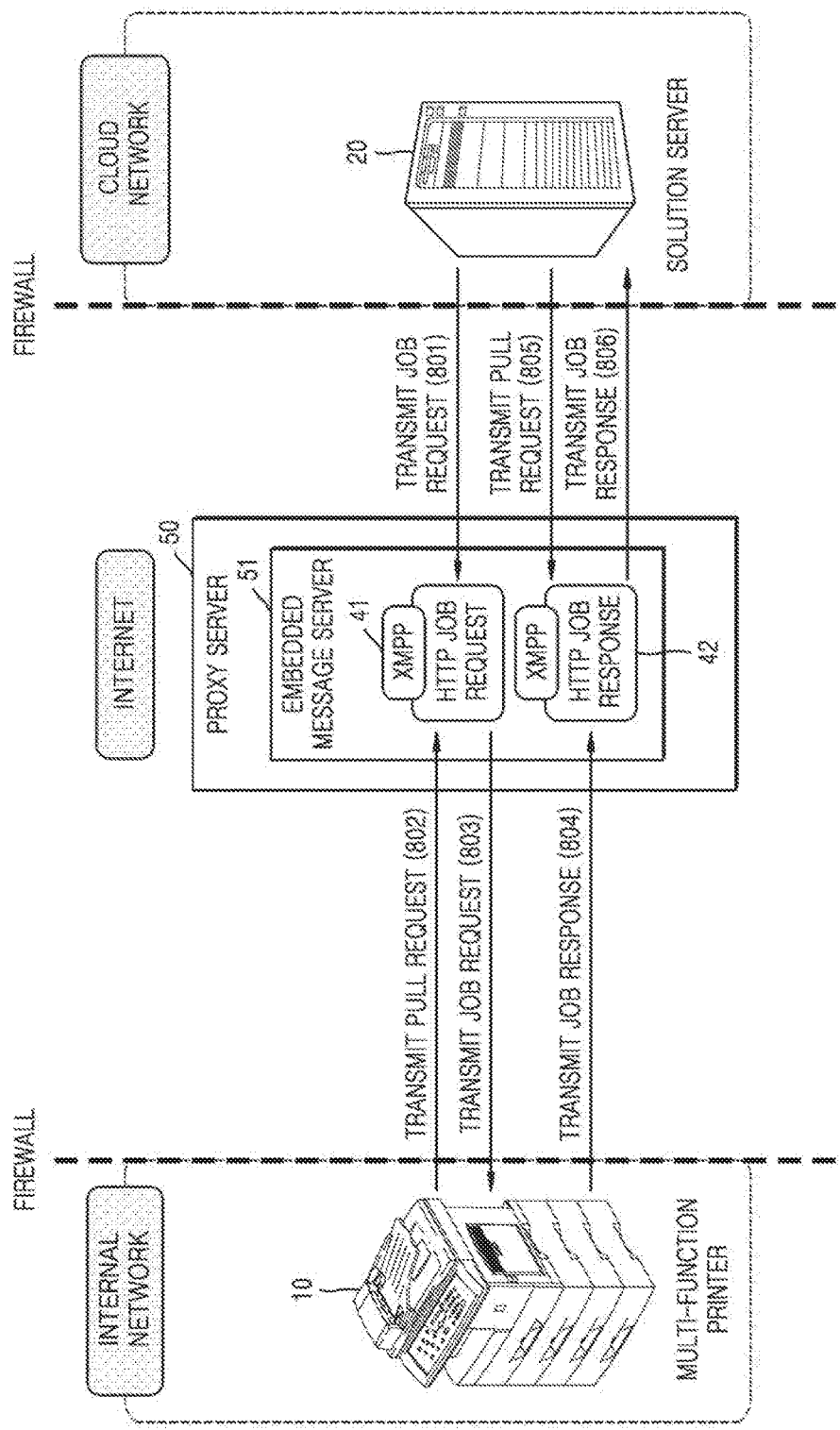
FIG. 8 is a diagram illustrating an environment for providing a solution service to a multi-function printer located behind a firewall, by a solution server located behind another firewall, by using a proxy server with an embedded message server, according to an exemplary embodiment.

FIG. 8 is a diagram illustrating an environment for providing a solution service to a multi-function printer located behind a firewall, by a solution server, located behind another firewall, by using a proxy server with an embedded message server, according to an exemplary embodiment.

The exemplary embodiment of FIG. 8 is substantially identical to the exemplary embodiment of FIG. 7 with the exception that a proxy server 50 including an embedded message server 51 is used instead of providing a separate message server. Thus, since a process for transmitting/receiving a request/response in operations 801 to 806 of FIG. 8 is the same as in operations 701 to 706 of FIG. 7, a redundant description thereof will be omitted for conciseness.

The above description has been made on the assumption that the multi-function printer supports a message protocol (e.g., XMPP) for communication with the message server. However, in some cases, the multi-function printer may not support the message protocol. In this case, an agent for enabling the multi-function printer to communicate with the message server may be provided on the internal network where the multi-function printer is located. An exemplary embodiment thereof is illustrated in FIG. 9.

Figure 9:
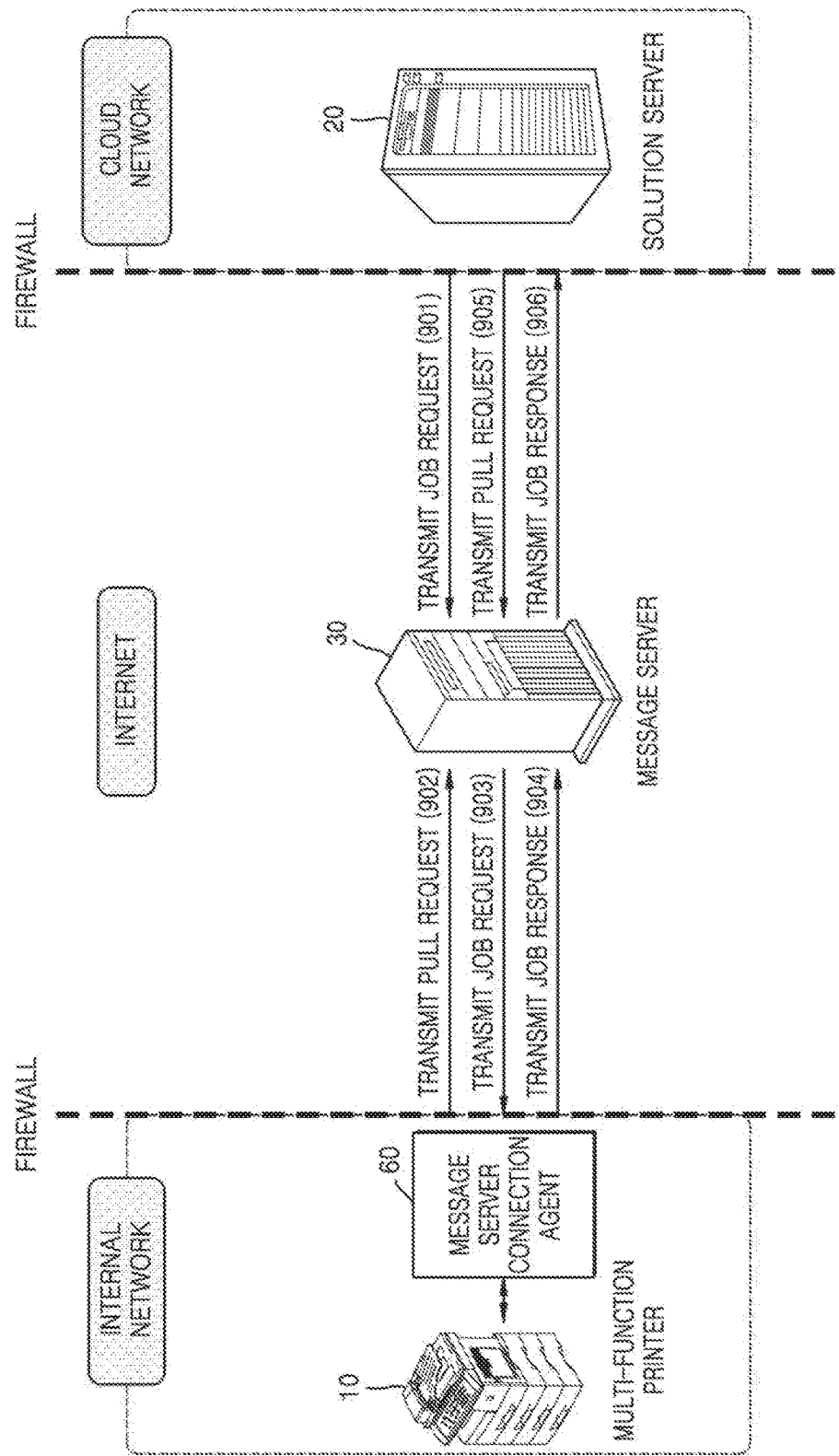
FIG. 9 is a diagram illustrating an environment in which an agent for connection to a message server supporting a solution service is provided on the side of a multi-function printer, according to an exemplary embodiment.

FIG. 9 is a diagram illustrating an environment in which an agent for connection to a message server supporting a solution service is provided on the side of a multi-function printer, according to an exemplary embodiment.

Referring to FIG. 9, a message server connection agent 60 is provided in an internal network where a multi-function printer 10 is located. The message server connection agent 60 may be installed as an embedded type in the multi-function printer 10, or may be provided as a separate device to relay the communication between the message server 30 and all multi-function printers provided in the internal network.

The message server connection agent 60 may extract an HTTP job request from XMPP-type data received from the message server 30 and transmit the same to the multi-function printer 10. Also, the message server connection agent 60 may convert the HTTP job response received from the multi-function printer 10 into XMPP-type data and transmit the same to the message server 30.

The exemplary embodiment of FIG. 9 is substantially identical to the exemplary embodiment of FIG. 7 with the exception that the message server connection agent 60 is provided on the side of the multi-function printer 10. Thus, since a process for transmitting/receiving a request/response in operations 901 to 906 of FIG. 9 is the same as in operations 701 to 706 of FIG. 7, a redundant description thereof will be omitted for conciseness.

Figure 10:
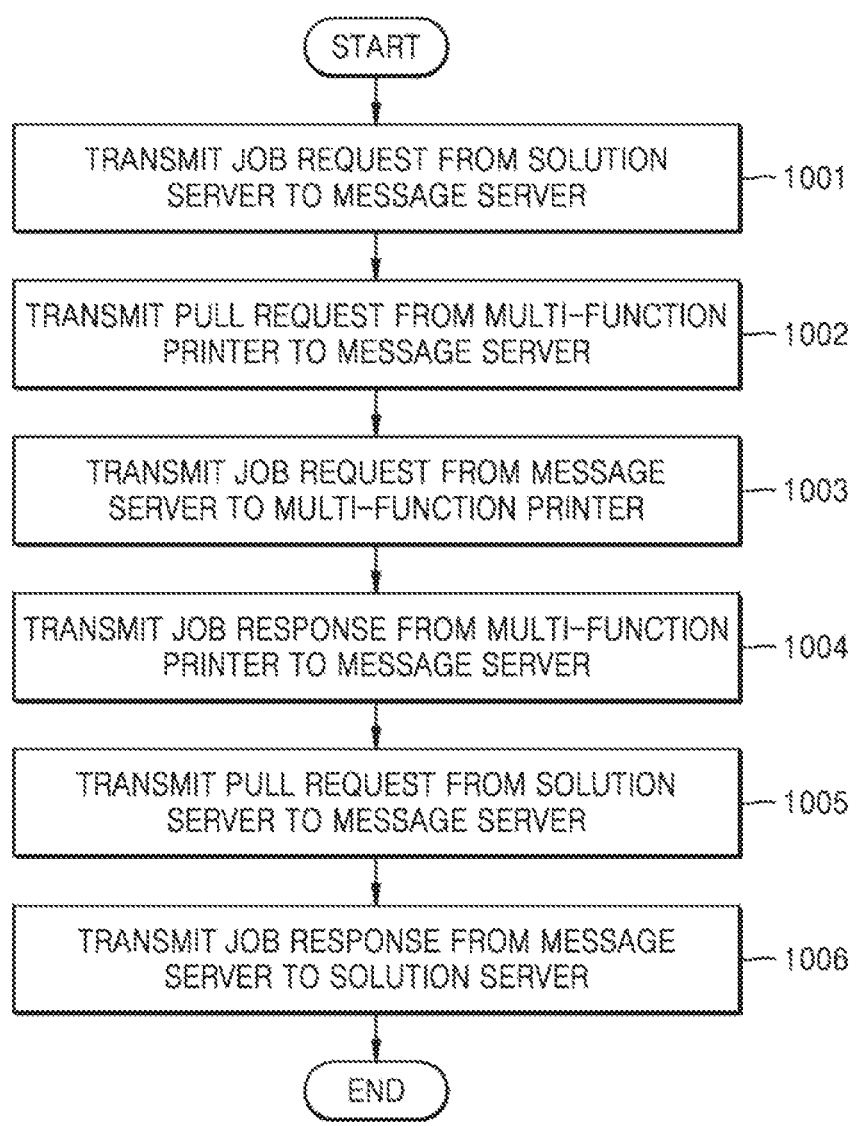
FIG. 10 is a flowchart illustrating a method for providing a solution service to a multi-function printer located behind a firewall, by a solution server located behind another firewall, by using a message server, according to an exemplary embodiment.

FIG. 10 is a flowchart illustrating a method for providing a solution service to a multi-function printer located behind a firewall, by a solution server located behind another firewall, by using a message server, according to an exemplary embodiment.

Referring to FIG. 10, in operation 1001, the solution server transmits a job request to the message server. In this case, in order to transmit the job request by using the XMPP, the solution server converts an HTTP-based job request into XMPP-type data and transmits the same to the message server.

In operation 1002, the multi-function printer transmits a pull request to the message server. In this case, the multi-function printer converts a pull request (HTTP request) into XMPP-type data and transmits the same to the message server.

In operation 1003, the message server transmits a job request to the multi-function printer in response to the pull request of operation 1002. In this case, the job request is received from the solution server and stored by the message server in operation 1001.

The multi-function printer performs a job corresponding to the job request received from the message server and transmits a job response to the message server in operation 1004. In this case, the multi-function printer converts the XMPP-type data received from the message server to extract an HTTP-based job request, and also converts the job response into XMPP-type data prior to transmission to the message server.

In operation 1005, the solution server transmits a pull request to the message server. In this case, like the multi-function printer in operation 1002, the solution server converts a pull request (HTTP request) into XMPP-type data and transmits the same to the message server.

In operation 1006, as a response to the pull request, the message server transmits the job response received from the multi-function printer to the solution server.

FIG. 7 illustrates an exemplary embodiment of using one message server. However, a separate message server may be provided for each of the multi-function printer and the solution server, and a job request/response may be transmitted/received through the communication between the two message servers. An exemplary embodiment thereof is illustrated in FIGS. 11 and 12.

Figure 11:
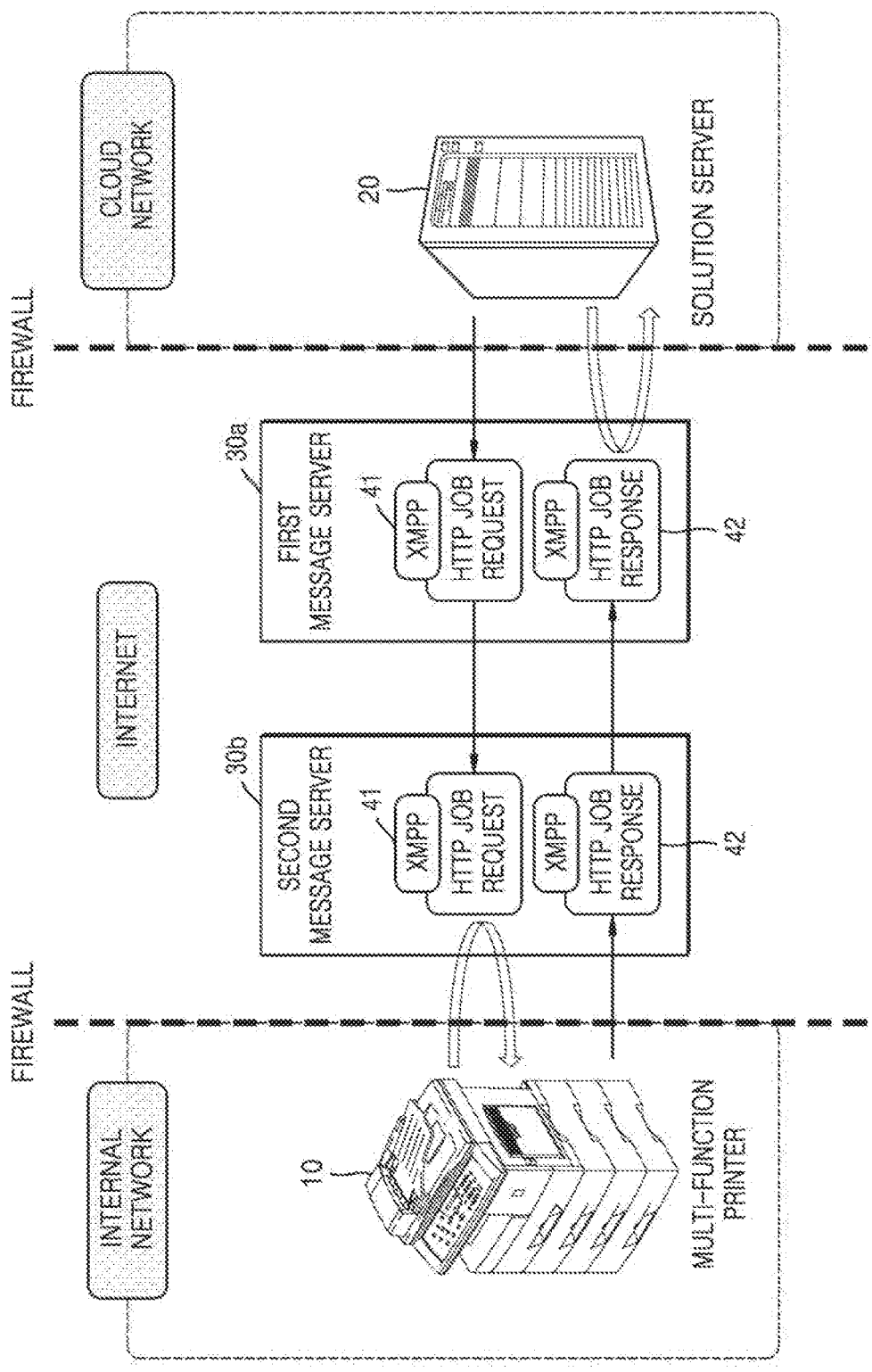
FIG. 11 is a diagram illustrating an environment for providing a solution service between a multi-function printer and a solution server located behind different firewalls, by using two message servers, according to an exemplary embodiment.
Figure 12:
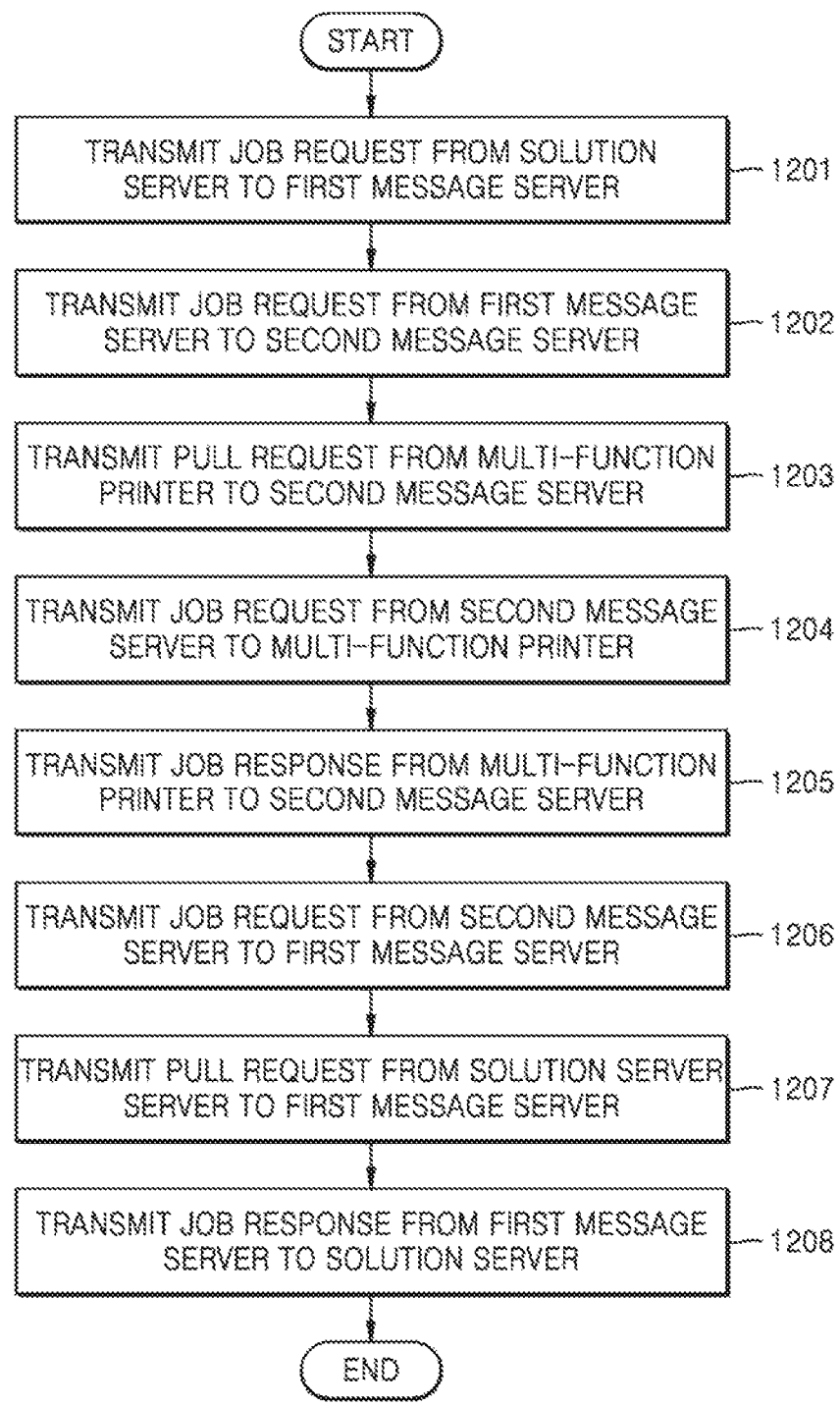
FIG. 12 is a flowchart illustrating a method for providing a solution service between a multi-function printer and a solution server located behind different firewalls, by using two message servers, according to an exemplary embodiment.

FIG. 11 is a diagram illustrating an environment for providing a solution service between a multi-function printer and a solution server, which are located behind different firewalls, by using two message servers, according to an exemplary embodiment.

Referring to FIG. 11, a solution server 20 communicates directly only with a first message server 30*a*, and a multi-function printer 10 communicates directly only with a second message server 30*b*. By performing communication, the first message server 30*a* and the second message server 30*b* transmit/receive a job request and a job response and provide the same to the solution server 20 and the multi-function printer 10 respectively.

That is, when the solution server 20 transmits a job request 41 to the first message server 30*a*, the first message server 30*a* transmits the received job request 41 to the second message server 30*b*. Thus, the multi-function printer 10 may pull the job request 41 by transmitting a pull request to the second message server 30*b*.

Also, upon completion of a job, the multi-function printer 10 transmits a job response 42 to the second message server 30*b*, and the second message server 30*b* transmits the job response 42 to the first message server 30*a*. Thus, the solution server 20 may pull the job response 42 by transmitting a pull request to the first message server 30*a*.

FIG. 12 is a flowchart illustrating a method for providing a solution service between a multi-function printer and a solution server, which are located behind different firewalls, by using two message servers, according to an exemplary embodiment.

Referring to FIG. 12, in operation 1201, the solution server transmits a job request to the first message server. In operation 1202, the first message server transmits the job request received from the solution server to the second message server. The multi-function printer transmits a pull request to the second message server in operation 1203, and the second message server transmits a job request to the multi-function printer as a response thereto in operation 1204.

Upon completion of job performance at the job request, the multi-function printer transmits a job response to the second message server in operation 1205. In operation 1206, the second message server transmits the job response received from the multi-function printer to the first message server. The solution server transmits a pull request to the first message server in operation 1207, and the first message server transmits a job response to the solution server as a response thereto in operation 1208.

By using a client library provided in the solution server, for communication with the message server, the solution server may perform functions such as connection setup, session management, and message protocol transmission and interpretation. Hereinafter, a method for communication between the solution server and the message server through the client library will be described with reference to FIGS. 13 and 14.

Figure 13:
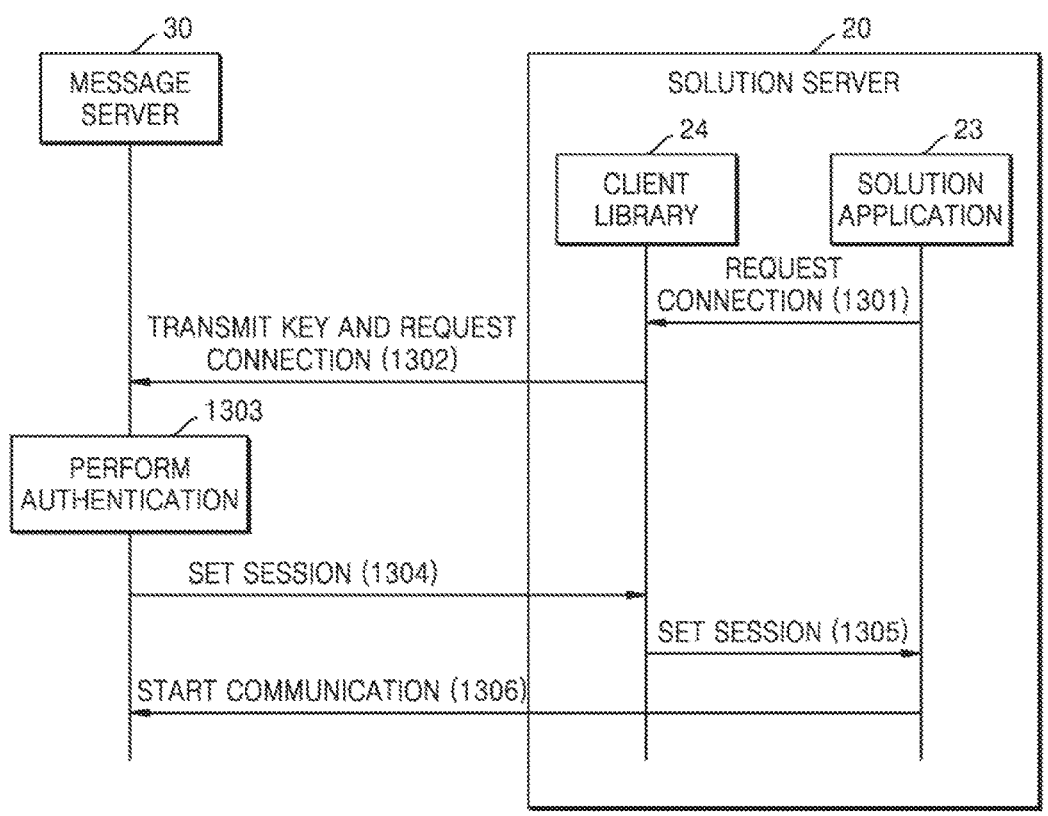
FIG. 13 is a diagram illustrating a process for setting a connection with a message server by a solution server by using a client library, according to an exemplary embodiment.

FIG. 13 is a diagram illustrating a process for setting a connection with a message server by a solution server by using a client library, according to an exemplary embodiment.

Referring to FIG. 13, a solution server 20 may include a solution application 23 and a client library 24. In this case, the solution application 23 is software that is installed in the solution server 20 to provide a solution service. Also, the client library 24 is software including a group of programs that are used to perform connection setup with the message server, session management, and message protocol transmission and interpretation.

In operation 1301, the solution application 23 requests the client library 24 to set a connection with a message server 30.

In operation 1302, the client library 24 transmits a connection request to the message server 30. In this case, the client library 24 may request the connection by transmitting a key by using endpoint host, port, and ID information of the message server 30.

In operation 1303, the message server 30 performs authentication by using the received key.

Upon completion of the authentication, the message server 30 sets a session for the client library 24 in operation 1304, and the client library 24 sets a session for the solution application 23 in operation 1305.

Upon completion of the session creation, in operation 1306, the solution application 23 may start communication with the message server 30.

Figure 14:
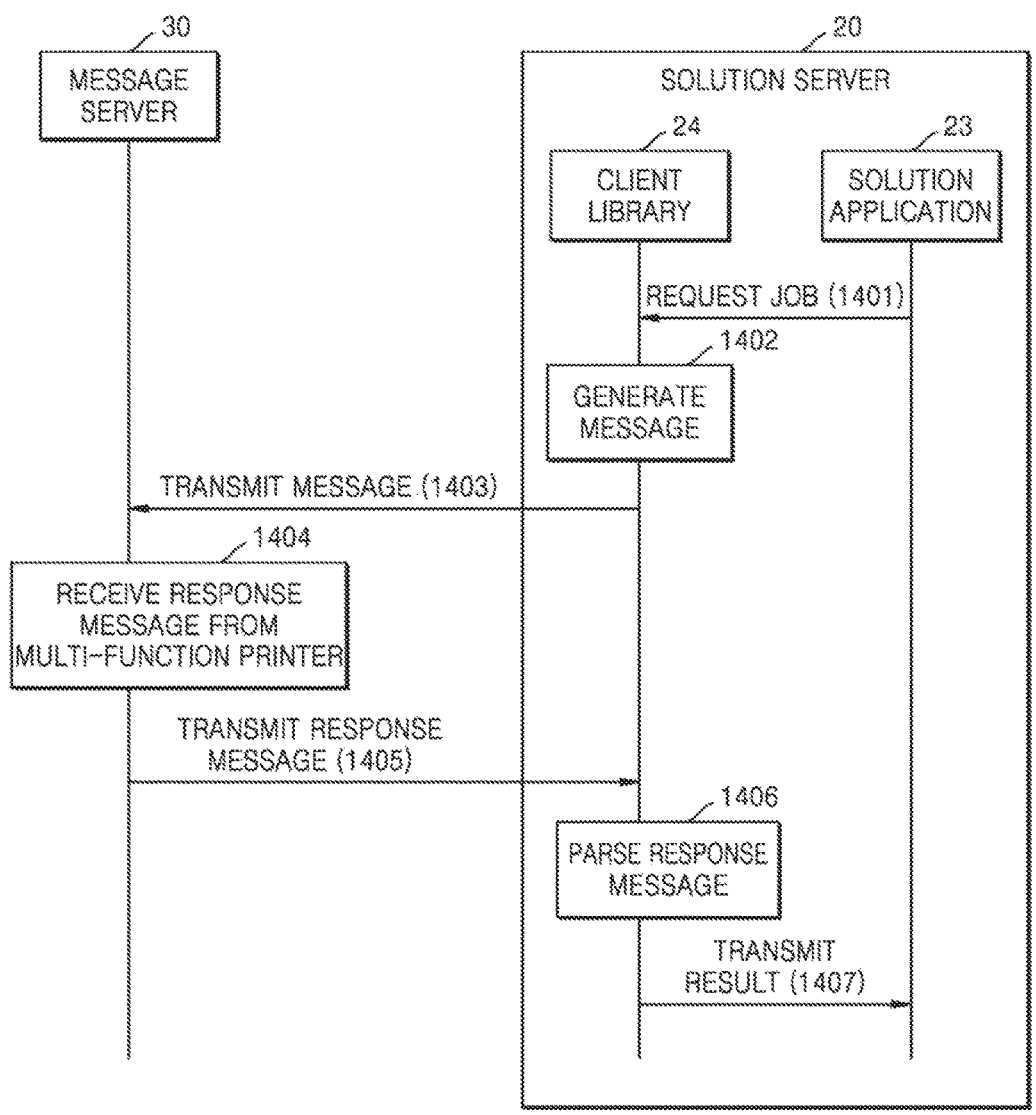
FIG. 14 is a diagram illustrating a process for transmitting and interpreting a message protocol by a solution server by using a client library, according to an exemplary embodiment.

FIG. 14 is a diagram illustrating a process for transmitting and interpreting a message protocol by a solution server by using a client library, according to an exemplary embodiment.

Referring to FIG. 14, the solution application 23 transmits a job request to the client library 24 in operation 1401, and the client library 24 generates a message including the received job request in operation 1402. For example, the client library 24 may generate a message by converting the HTTP-based request received from the solution application 23 into XMPP-type data.

In operation 1403, the client library 24 transmits the generated message to the message server 30.

When receiving a response message from the multi-function printer in operation 1404, the message server 30 transmits the received response message to the client library 24 in operation 1405. In this case, the response message transmitted from the message server 30 to the client library 24 is XMPP-type data. Thus, the client library 24 extracts an HTTP-based response from the XMPP-type data by parsing the received response message in operation 1406, and transmits the extracted result to the solution application 23 in operation 1407.

Also, not only the solution server but also the multi-function printer may require a module related to message protocol processing. An example of providing the module in the multi-function printer is illustrated in FIG. 15.

Figure 15:
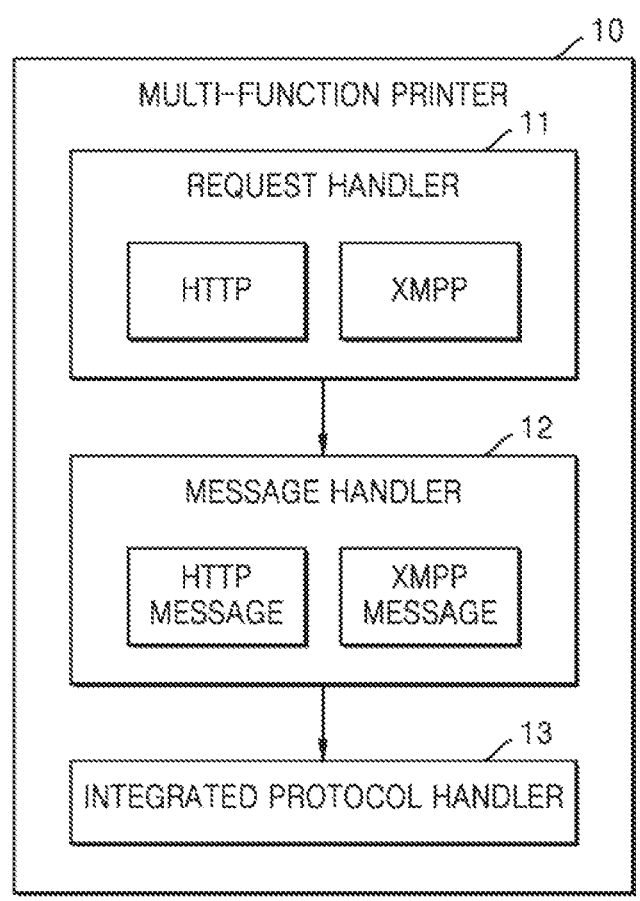
FIG. 15 is a diagram illustrating component modules of a multi-function printer for processing a message protocol, according to an exemplary embodiment.

FIG. 15 is a diagram illustrating component modules of a multi-function printer for processing a message protocol, according to an exemplary embodiment.

Referring to FIG. 15, a multi-function printer 10 may include a request handler 11, a message handler 12, and an integrated protocol handler 13.

The request handler 11 identifies a received message protocol type and transfers a message to the handler corresponding to the identified protocol type. The exemplary embodiment illustrated in FIG. 15 may include HTTP and XMPP as communication protocol types.

The message handler 12 performs authentication for determination of the validity of a message protocol, and interprets the contents of the message protocol. In particular, for example, information used for authentication processing, that is, authentication information, may include information about a host requesting a message, a key, and a token for checking the integrity of a message protocol, and the information may be included as a header information type in the message protocol.

FIG. 16 illustrates an example of a message protocol including authentication information in a header thereof. Referring to FIG. 16, 1600a is a message protocol including a job request, and it may be seen that authentication information 1601 is included in a header thereof. Also, 1600b is a message protocol including a job response, and it may be seen that authentication information 1602 is included in a header thereof.

Referring back to FIG. 15, the integrated protocol handler 13 interprets data about an actual request/response included in the message protocol.

In order to connect the multi-function printer to the message server, information of the message server may be set in the multi-function printer. In this case, the information of the message server may include, for example, identification information of the message server such as domain information, a port number, an IP address, and a host name of the message server, unique ID information for identification of the multi-function printer, a resource name about the multi-function printer, an ID and password for authentication in the message server, and friend information corresponding to the ID of the multi-function printer. The following two methods may be used to set the information of the message server in the multi-function printer.

The first method is to set the information of the message server in the multi-function printer in the process of installing an application for a solution service in the multi-function printer. In this case, as described with reference to FIG. 1, the application installed in the multi-function printer refers to the installation file including the information of the solution server, not the solution application. This method may be used when the solution server has a dedicated message server that is used only to provide a solution service to the multi-function printer.

The second method is to set the information of the message server in the multi-function printer through, for example, a separate local UI (LUI) and/or a remote UI. This method may be used when the solution server does not have a dedicated message server and uses a message server that is shared with a plurality of solution servers and a plurality of multi-function printers.

Figure 17:
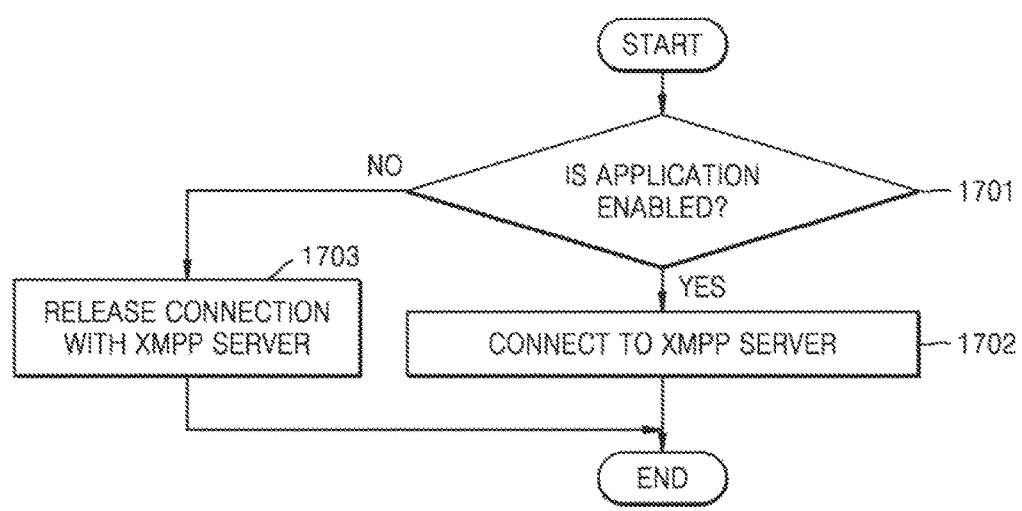
FIG. 17 is a flowchart illustrating a method for setting a connection with a message server by a multi-function printer according to whether an application is enabled.

According to the first method, the multi-function printer may set or release the connection with the message server according to whether the application is enabled. FIG. 17 is a flowchart illustrating a method for setting a connection with a message server by a multi-function printer according to whether an application is enabled.

Referring to FIG. 17, in operation 1701, the multi-function printer determines whether the application is enabled. When the application is enabled, the multi-function printer attempts to access the message server in operation 1702. In this case, the multi-function printer notifies the message server about the status (presence) of the multi-function printer and changes to a state for receiving a request of the solution server through a message. FIG. 19 illustrates an example of a status message 1900 that is transmitted to a message server by a multi-function printer when the multi-function printer is connected to the message server. As a result of the determination in operation 1701, when the application is not enabled, the multi-function printer releases the connection with the message server in operation 1703.

Figure 18:
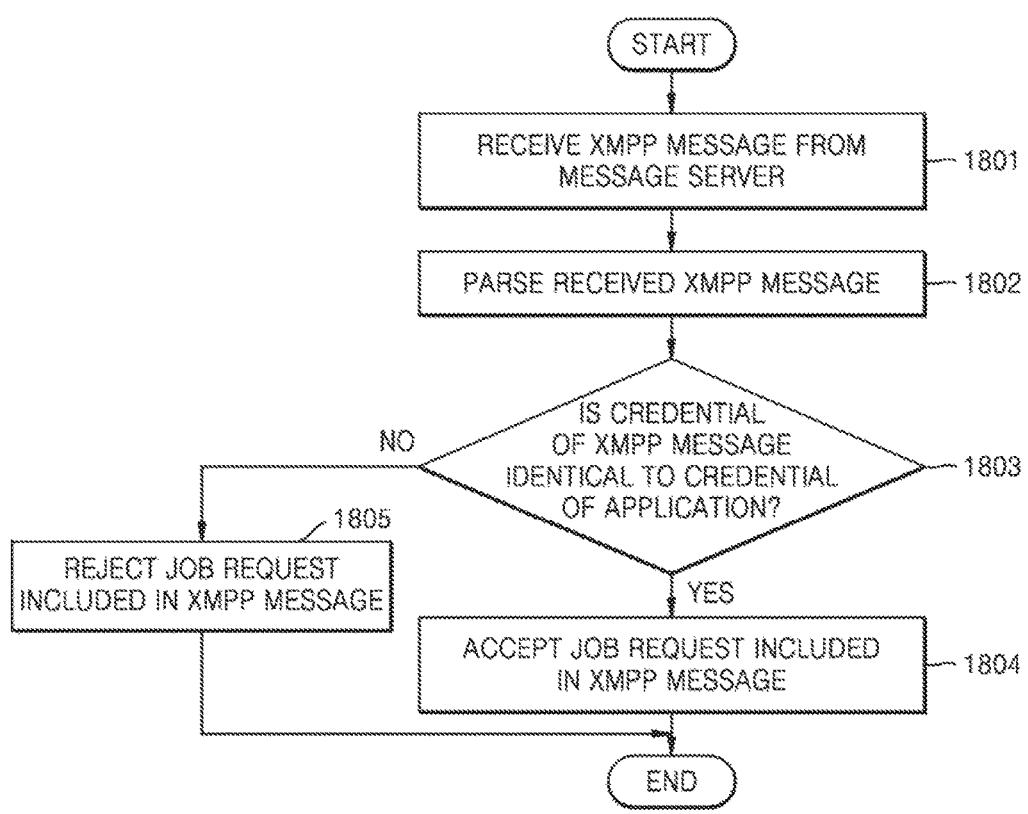
FIG. 18 is a flowchart illustrating a method for performing authentication by a multi-function printer by using a credential of a message received from a message server.

When the connection between the multi-function printer and the message server is set, the multi-function printer may receive an XMPP message from the message server. In this case, the multi-function printer may allow only the message exchange with the application installed in the solution server. Thus, for this purpose, the multi-function printer compares a credential included in the received XMPP message with a credential of the application installed in the solution server. FIG. 18 is a flowchart illustrating a method for performing authentication by a multi-function printer by using a credential of a message received from a message server.

Referring to FIG. 18, in operation 1801, the multi-function printer receives an XMPP message from the message server. In operation 1802, the multi-function printer parses the received XMPP message. In operation 1803, the multi-function printer determines whether the credential of the XMPP message is identical to the credential of the application installed in the solution server. As a result of the determination in operation 1803, when the credential of the XMPP message is identical to the credential of the application installed in the solution server, the multi-function printer accepts a job request included in the XMPP message, in operation 1804. On the other hand, when the credential of the XMPP message is not identical to the credential of the application installed in the solution server, the multi-function printer rejects the job request included in the XMPP message, in operation 1805.

When the multi-function printer is connected to the message server, the message server may transmit a service discovery request to the multi-function printer and the multi-function printer may transmit a message including a supportable service list to the message server. FIG. 20 illustrates an example of a response message 2000 to a service discovery request of a message server when a multi-function printer is connected to the message server.

Also, when connected to the message server, the multi-function printer generates a list of clients to communicate with the multi-function printer. The multi-function printer notifies its status information and the supportable service list to the clients included in its client list.

Figure 21:
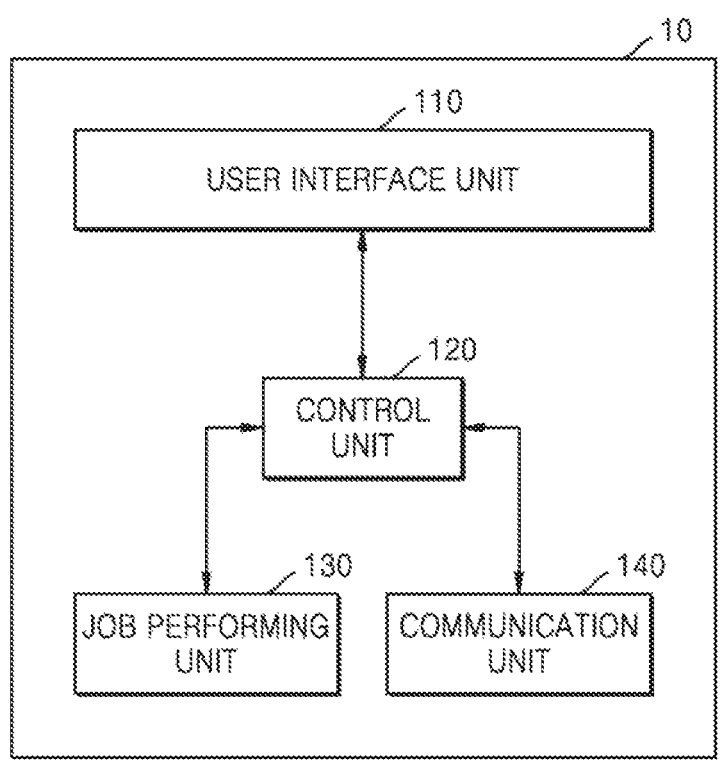
FIG. 21 is a diagram illustrating a configuration of a multi-function printer according to an exemplary embodiment.

FIG. 21 is a diagram illustrating a configuration of a multi-function printer according to an exemplary embodiment. Referring to FIG. 21, a multi-function printer 10 may include a user interface (UI) unit 110, a control unit 120, a job performing unit 130, and a communication unit 140.

The user interface unit 110 may provide a UI for a solution application installed in a solution server and receive a user input from the user. In detail, for example, the user interface unit 110 may include a display panel for displaying a screen and an operation button for receiving a user input, or may be implemented as a touchscreen type.

The control unit 120 may be configured to control an overall operation of the multi-function printer 10. In particular, for example, the control unit 120 may control the reception of a job request of the solution server and the performance of a job. In particular, for example, when the multi-function printer 10 is located behind the firewall and the access from outside the firewall is restricted, the control unit 120 may receive a job request by accessing the message server or the solution server outside the firewall. That is, for example, the control unit 120 may first transmit a pull request to the message server or the solution server outside the firewall and receive a job response as a response to the pull request. Also, the control unit 120 may identify a requested job by parsing a job request received after being converted into a data type of the message protocol, and may convert a job response, which represents a result of performing the job, into a data type of the message protocol and transmit the same to the message server or the solution server.

The job performing unit 130 may be configured to perform a job corresponding to a job request of the solution server. For example, the job performing unit 130 may perform a job such as printing, copying, or scanning, or may identify or change relevant information.

The communication unit 140 may receive a job request of the solution server and transmit a job response, and may communicate with the solution server directly or through the message server.

Aspects of the disclosure have been particularly shown and described with reference to the exemplary embodiments thereof. However, those of ordinary skill in the art will understand that various changes in form and details may be made therein without departing from the spirit and scope of the disclosure as defined by the appended claims. Thus, the exemplary embodiments should be considered in a descriptive sense only and not for purposes of limitation. Therefore, the scope of the disclosure may be defined not by the above detailed descriptions but by the following claims, and all differences within the scope will be construed as being included in the inventive concept.

The exemplary embodiments of the disclosure may be written as one or more computer programs and may be implemented in general-purpose digital computers that may execute the one or more programs by using non-transitory computer-readable recording media. Examples of the non-transitory computer-readable recording media may include magnetic storage mediums such as ROMs, floppy disks, or hard disks, optical recording mediums such as CD-ROMs or DVDs, and transmission mediums such as Internet transmission mediums.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A system for providing a solution service to an image forming apparatus, the system comprising:
    a message server configured to communicate with a solution server and an image forming apparatus, a first firewall being provided between the image forming apparatus and the message server to restrict access from the message server to the image forming apparatus, and a second firewall being provided between the solution server and the message server to restrict access from the message server to the solution server,
    wherein the message server
    receives a job request from the solution server for the image forming apparatus by using a message protocol,
    receives a first pull request from the image forming apparatus requesting the message server to transmit the job request, received from the solution server, to the image forming apparatus, in response to the first pull request from the image forming apparatus,
    receives a job response representing a result of performing the job by the image forming apparatus according to the job request, the received job response having been converted into a data type of the message protocol,
    receives a second pull request from the solution server, and
    transmits the received job response to the solution server in response to the second pull request.

2. The system of claim 1, wherein
    the message server stores the received job request, and
    the received job request having been converted into the data type of the message protocol by the solution server.

3. The system of claim 2, wherein
    the message server transmits the stored job request to the image forming apparatus in response to the first pull request.

4. The system of claim 1, wherein
    the message server stores the received job response, and
    the received job response having been converted into the data type of the message protocol by the image forming apparatus.

5. The system of claim 1, wherein the message server is implemented as a proxy server relaying a communication between the image forming apparatus and the solution server.

6. The system of claim 1, wherein the message server comprises:
    a first message server configured to communicate with the solution server; and
    a second message server configured to communicate with the image forming apparatus and the first message server,
    wherein
    the first message server receives the job request from the solution server and transmits the job request transmitted by the solution server to the second message server,
    the second message server receives the job response from the image forming apparatus and transmits the job response transmitted by the image forming apparatus to the first message server,
    the second message server transmits the job request to the image forming apparatus, in response to the first pull request from the image forming apparatus, and
    the first message server transmits the received job response to the solution server, in response to the second pull request from the solution server.

7. The system of claim 1, wherein the message server communicates with the image forming apparatus through a message server connection agent embedded in or implemented outside the image forming apparatus.

8. The system of claim 1, wherein
    the message server receives the job request, the first pull request, the job response, and the second pull by using a same message protocol, and
    the same message protocol includes XMPP-type data.

9. An image forming apparatus, comprising:
    a communication interface configured to communicate with a solution server through a message server;
    a user interface (UI) configured to provide a UI for a solution application installed in the solution server and to receive a user input;
    a job performing apparatus configured to perform an image forming job; and
    a controller configured:
        to control the communication interface to transmit a first pull request to the message server requesting the message server to transmit a job request transmitted to the message server from the solution server, and to receive the job request from the message server in response to the pull request,
        to control the job performing apparatus to perform the image forming job corresponding to the job request, and
        to control the communication interface to transmit a job response to the message server representing a result of performing the image forming job according to the job request, for the message server to transmit the job response to the solution server in response to a second pull request job request transmitted to the message server from the solution server,
    wherein
    a first firewall is provided between the image forming apparatus and the message server to restrict access from the message server to the image forming apparatus, and
    a second firewall is provided between the solution server and the message server to restrict access from the message server to the solution server.

10. The image forming apparatus of claim 9, wherein
    the controller controls the communication interface to periodically transmit the first pull request to the message server and the communication interface receives the job request from the message server in response to the first pull request.

11. The image forming apparatus of claim 9, wherein the controller converts the job response into a data type of a message protocol, and controls the communication interface to transmit the converted job response to the message server.

12. A method for providing a solution service to an image forming apparatus by a message server, the method comprising:
- receiving, from a solution server, a job request for the image forming apparatus by using a message protocol;
- receiving, from the image forming apparatus, a first pull request requesting the message server to transmit the job request transmitted from the solution server;
- transmitting, to the image forming apparatus, the job request transmitted from the solution server in response to the first pull request from the image forming apparatus;
- receiving a job response representing a result of performing the job by the image forming apparatus according to the job request, the received job response having been converted into a data type of the message protocol;
- receiving a second pull request from the solution server; and
- transmitting the received job response to the solution server in response to the second pull request, wherein
- a first firewall is provided between the image forming apparatus and the message server to restrict access from the message server to the image forming apparatus, and
- a second firewall is provided between the solution server and the message server to restrict access from the message server to the solution server.

13. The method of claim 12, further comprising:
storing the received job request, the received job request having been converted into the data type of the message protocol by the solution server.

14. The method of claim 13, wherein
the transmitting of the job request, to the image forming apparatus, comprises transmitting the job request stored in the message server, in response to the first pull request.

15. The method of claim 12, further comprising:
storing the received job response, the received job response having been converted into the data type of the message protocol by the image forming apparatus.

* * * * *